(12) United States Patent
Huang et al.

(10) Patent No.: US 6,771,709 B2
(45) Date of Patent: Aug. 3, 2004

(54) SYSTEM AND METHOD FOR DIRECT TRANSMITTER SELF-CALIBRATION

(75) Inventors: Xinping Huang, Nepean (CA); Mario Caron, Aylmer (CA)

(73) Assignee: Her Majesty the Queen in right of Canada, as represented by the Minister of Industry, Ottawa (CA)

( * ) Notice: Subject to any disclaimer, the term of this patent is extended or adjusted under 35 U.S.C. 154(b) by 76 days.

(21) Appl. No.: 10/268,691

(22) Filed: Oct. 11, 2002

(65) Prior Publication Data

US 2003/0095607 A1 May 22, 2003

Related U.S. Application Data

(60) Provisional application No. 60/329,339, filed on Oct. 16, 2001.

(51) Int. Cl.[7] .............................................. H04L 25/03

(52) U.S. Cl. ...................................................... 375/296

(58) Field of Search ................................ 375/296, 297; 455/126; 330/2, 129, 136, 149

(56) References Cited

U.S. PATENT DOCUMENTS

| | | | |
|---|---|---|---|
| 4,717,894 A | | 1/1988 | Edwards et al. |
| 4,930,141 A | | 5/1990 | Ohmagari |
| 5,293,406 A | | 3/1994 | Suzuki |
| 5,387,883 A | | 2/1995 | Ueda |
| 5,663,691 A | | 9/1997 | Kowalik et al. |
| 5,867,065 A | * | 2/1999 | Leyendecker ............... 330/149 |
| 5,903,823 A | | 5/1999 | Moriyama et al. |
| 5,990,734 A | | 11/1999 | Wright et al. |
| 6,054,894 A | | 4/2000 | Wright et al. |
| 6,054,896 A | | 4/2000 | Wright et al. |
| 6,081,698 A | | 6/2000 | Moriyama et al. |
| 2002/0196864 A1 | * | 12/2002 | Booth et al. ................. 375/296 |

OTHER PUBLICATIONS

Cavers et al., "Adaptive compensation for imbalance and offset losses in direct conversion transceivers", Proc. Of IEEE Vehicular Technology Conference, May 19–22, 1991, pp. 578–583.

Cavers et al., "Adaptive compensation for imbalance and offset losses in direct conversion transceivers", IEEE Trans. On Vehicular Technology, vol. 42, No. 4, Nov. 1993, pp. 581–588.

Cavers, "A fast method for adaptation of quadrature modulators and demodulators in amplifier linearization circuits", Proc. Of IEEE Vehicular Technology Conference, Atlanta, Apr. 28–May 1, 1996, vol. II, pp. 1307–1311.

Cavers, "New methods for adaptation of quadrature modulators and demodulators in amplifier linearization circuits", IEEE Trans. On Vehicular Technology, vol. 46, No. 3, Aug. 1997, pp. 707–716.

(List continued on next page.)

Primary Examiner—Don N Vo
(74) Attorney, Agent, or Firm—Freedman & Associates

(57) ABSTRACT

A method for self-calibrating a vector modulator is disclosed, including the step of pre-distortion coefficients in dependence upon an in-phase signal, a quadrature signal, and an output envelope of an RF signal, and further comprising the steps of transforming a value representative of an output envelope represented in a nonlinear domain into a value representative of the output envelope represented in a linear domain, determining a parameter vector x as a solution of a linear equation within the linear domain, and determining the pre-distortion coefficients from the parameter vector x. Further described is a compensating quadrature modulator for self-calibrating a vector modulation process, the compensating quadrature modulator comprising an I-signal transmit chain for pre-distorting and transmitting an in-phase signal, a Q-signal transmit chain for pre-distorting and transmitting a quadrature signal, as well as a digital signal processor coupled to the I- and Q-signal transmit chains, and providing pre-distortion coefficients.

25 Claims, 7 Drawing Sheets

OTHER PUBLICATIONS

Faulkner et al., "Automatic adjustment of quadrature modulators", Electronics Letters, vol. 27, No. 3, Jan. 31, 1991, pp. 214–216.

Hilborn et al., "An adaptive direct conversion transmitter", IEEE Trans. On Vehicular Technology, vol. 43, No. 2, May 1994, pp. 223–233.

Huang et al., "Adaptive Gain/Phase/DC Offset Compensation in Quadrature Modulators", Proceedings of ISPACS, Nov. 20–23, 2001, Nashville, USA.

Huang et al., "Gain/Phase Imbalance and DC Offset Compensation in Quadrature Modulator", Proceedings of ISCAS 2002, May 26–29, 2002, Arizona, USA.

Leyonhjelm et al., "The effect of reconstruction filters on direct upconversion in a multichannel environment", IEEE Trans. On Vehicular. Technology, vol. 44, No. 1, Feb. 1995, pp. 95–102.

Lohtia et al., "An adaptive digital technique for compensating for analog quadrature modulator/demodulator impairments", IEEE PACRIM 1993 Conference Proceedings, Victoria, May 19–21, 1993, vol. II, pp. 447–450.

Marchesani, "Digital precompensation of imperfections in quarature modulators,", IEEE Trans. On Comm., vol. 48, No. 4, Apr. 2000, pp. 552–556.

Ren et al., "Improvement of digital mapping predistorters for linearising transmitters", 1997 IEEE–MTT–S proceeding, Jun. 8–13, 1997, vol. III, pp. 1691–1694.

Tuthill et al., "Automatic digital pre–compensation in IQ modulators", 1999 IEEE Int'l Conf. On Acoustics, Speech and Signal Processing, vol. III, pp. 1621–1624.

Yang et al., "I/Q modulator image rejection through modulation pre–distortion", Proc. Of IEEE Vehicular Technology Conference, Atlanta, Apr. 28–May 1, 1996, vol. II, pp. 1317–1320.

* cited by examiner

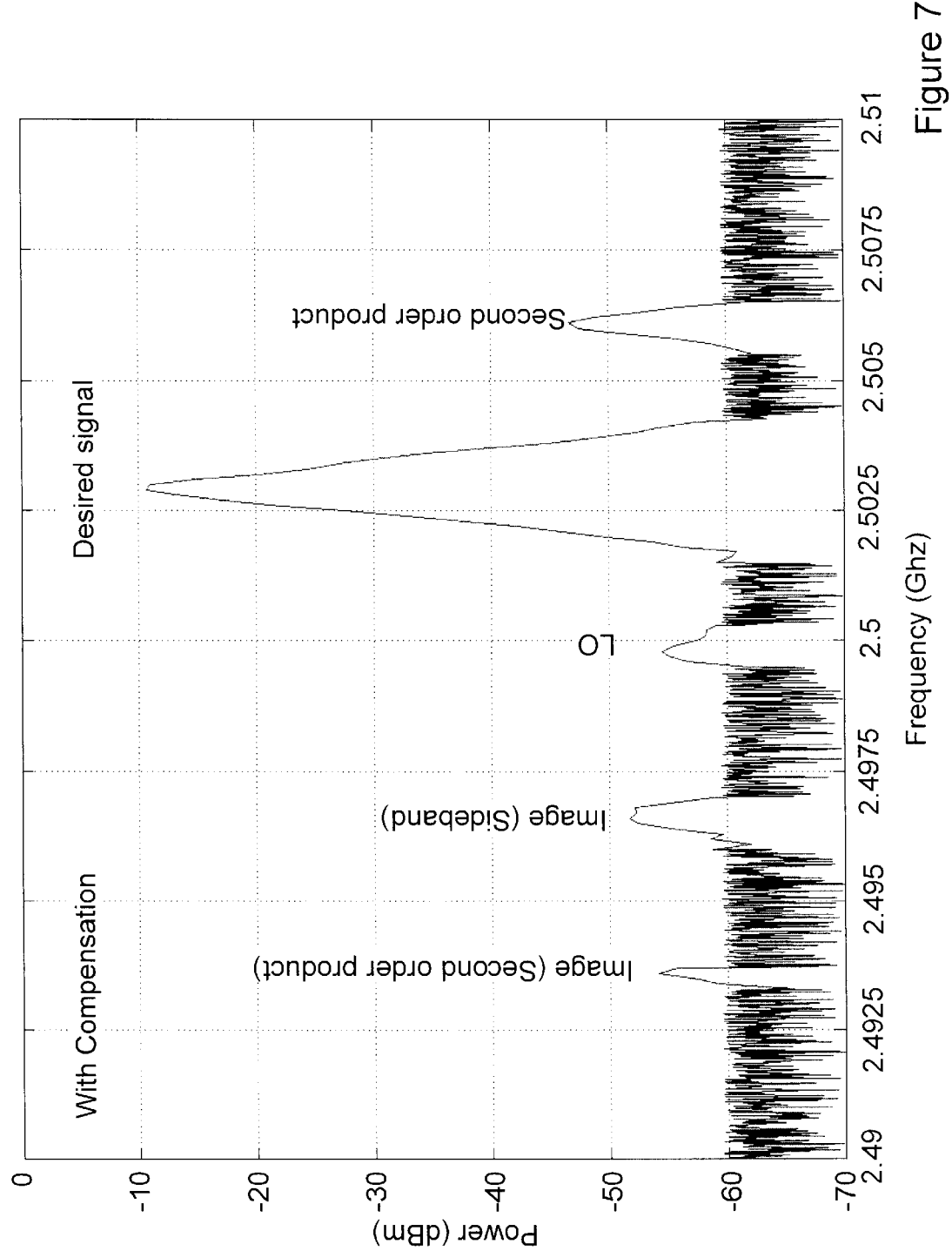

SYSTEM AND METHOD FOR DIRECT TRANSMITTER SELF-CALIBRATION

This application claims benefit from U.S. Provisional Patent Application No. 60/329,339 filed on Oct. 16, 2001.

FIELD OF THE INVENTION

The instant invention relates to calibration of quadrature (I/Q) modulators, and in particular to self-calibration of a direct transmitter used in digital communication system, as well as in radar and instrumentation fields.

BACKGROUND OF THE INVENTION

Digital communication techniques are by now the emerging standard in almost all areas of telecommunication. Digital communication is often based on a special class of communication signals, sent by a transmitter and received by a receiver, using digital modulation techniques. These techniques make use of a class of signal modulators, which perform vector or quadrature modulation. A vector-modulated or quadrature-modulated signal is an amplitude and phase modulated signal that is modulated according to in-phase and quadrature phase components, which define a phase vector. In vector or quadrature modulation, two modulation input signals independently modulate the in-phase (I) and quadrature (Q) components of a carrier signal. For proper operation, the I and Q channels of the modulator are ideally calibrated to be equal in gain, i.e. balanced, and 90° apart, i.e. in quadrature.

It is known that gain and phase imbalance between the I and Q channels in a vector or quadrature modulator degrade the overall communication link performance. Although compensation within a quadrature receiver for eliminating the performance degradation due to the phase imbalance is effective, the degradation due to the gain imbalance is not to be eliminated at the receiver in a straightforward manner. In addition, any DC offsets possibly cause a local oscillator (LO) signal to leak through the vector modulator, the LO being part of the vector modulator. In many cases, vector modulators designed to be fed I- and Q-signals with a given DC offset, for example 0.5 V. After fabrication of the vector modulator, the optimal DC offset optionally takes on values that are different from the designed values. For example, the optimal DC offset for the I-channel is 0.48V, whereas the optimal offset for the Q-channel is 0.52 V. Therefore, the expression "correcting for DC offset" has to be understood as "compensation for deviation from an optimal DC offset".

The leakage as well as the gain and phase imbalance distort the transmitted signal, and make it difficult to meet a given spectrum mask requirement. Therefore, it is desirable to eliminate or minimize imbalances and deviations from optimum offsets at the transmitter. Preferably, a calibration process is used to achieve this task.

Given the importance of digital communication in today's media world, a plethora of studies have been devoted to estimating and correcting for errors in vector modulators, and improving performance of direct transmitters. Therefore, the instant invention will be better understood and highly appreciated, when viewed in the context of relevant prior art.

Tuthill and Cantoni (1999 IEEE Int'l Conf. on Acoustics, Speech and Signal Processing, Vol. III, pp. 1621–1624) describe a method for compensation of the imperfections of reconstruction filters only. The proposed methodology is to adaptively control the digital channel filters to compensate for the reconstruction filter imperfections, such as departure from linear phase and from constant amplitude response, as well as gain and phase imbalance between I and Q filters. However, this methodology does not address the vector modulator imperfections.

Leyonhjelm and Faulkner (IEEE Trans. on Vehicular. Technology, Vol 44, No. 1, February 1995, pp. 95–102) address the use of a direct modulator for multiple channels. The phase and gain imbalances in transmit I and Q channels exhibit a frequency dependency, and thus require adjustment. The proposed technique is to add to each channel a lower side band (LSB) signal that will destructively add with the one generated. However, a channel has to be free, when the LSB signal to be inserted is determined, a frequency down conversion of the transmitted signal is also necessary.

Hilborn, Stapleton, and Cavers (IEEE Trans. on Vehicular Technology, Vol 43, No. 2, May 1994, pp. 223–233) propose a technique to compensate for both the quadrature modulator imperfections and the nonlinearities in power amplifiers. The technique to derive both quadrature modulator pre-distortion coefficients and amplifier linearizer coefficients is based on measuring the signal power in a channel adjacent to the desired one. It is shown that the power in the adjacent signal is approximately a quadratic function of the modulator and amplifier distortions. However, a pre-selection filter is needed at the output port to reject the transmitted signal and to look at an adjacent channel only. The technique works only when modulator and amplifier imperfections are small so that certain underlying approximations remain valid.

Cavers and Liao (IEEE Trans. on Vehicular Technology, Vol. 42, No. 4, November 1993, pp. 581–588.) propose a technique to compensate for direct modulator imperfections. A power detector is used to sample a modulator output signal, and by feeding the modulator with a known sequence of signals, coefficients for DC offset and gain and phase imbalance compensation are derived. This sequential technique adjusts first the DC offset and then the gain and phase imbalances. A series of tones with four different phases is used to derive the required gain and phase imbalance adjustment factors. A least-mean-square technique is used to average the coefficients obtained from several measurements, and to converge to a steady state. The adaptation and calibration is performed during non-transmission periods of time. In addition, the DC offset coefficients are calibrated by grounding the inputs of the vector modulator. In this case, measuring the output power of the modulator with a power detector is difficult, and the accuracy of the results is a function of sensitivity of a power detector and a dynamic range of a feedback system. Disadvantageously, it is necessary to make measurements with no signal fed to the vector modulator and thus requires a feedback loop (i.e. power detector and analog-to-digital converter) with high dynamic range operating during non-transmission periods of time.

Cavers and Liao (Proc. of IEEE Vehicular Technology Conference, May 19–22, 1991, pp. 578–583) propose a technique to be used at the receiver to compensate for both transmitter and receiver imperfections. A three-tap equalizer is used at the receiver in either a decision directed mode or reference aided mode. Although the authors claim that all the modulator imperfections are compensated, a modulator gain imbalance likely results in a signal-to-noise ratio degradation that is not likely recovered at the receiver. In addition, transmitter DC offset losses translate into local oscillator LO leakage which consumes transmit power inefficiently as opposed to power used for transmission of the desired signal. The quadrature signals are possibly recovered at the receiver even in the presence of modulator imperfections at a cost of a likely performance loss.

Cavers (IEEE Trans. on Vehicular Technology, Vol. 46, No. 3, August 1997, pp. 707–716) also derives pre-distortion coefficients from a solution of a set of linear equations. This technique is iterative, and usually uses two or more iterations to result in reasonable performance. The approximations made in solving the linear equations are only valid when errors are small. Further, the technique is computationally costly, and matrices are not likely to be well conditioned. Thus, a matrix inversion algorithm necessary is likely to be non trivial.

Ren and Wolff (1997 IEEE-MTT-S proceeding, Jun. 8–13, 1997, vol. 111, pp. 1691–1694) describe a technique to determine pre-distortion coefficients. The technique relies on demodulating the modulator's output signal and building a database of correction factors for each potential I and Q signal to be transmitted. However, this method relies on a transmitter signal demodulated in a feedback loop.

Yang, Vos and Cho (Proc. of IEEE Vehicular Technology Conference, Atlanta, Apr. 28–May 1, 1996, Vol. II, pp. 1317–1320) address gain and phase imbalance effects in a direct modulator. They present a correction algorithm, which is not likely to be intended for real time implementations but as part of a calibration phase in a production line instead. Phase and gain imbalance pre-distortion factors are determined using a two-dimensional root finding algorithm, utilizing signal-to-image rejection ratio measured with a spectrum analyzer as a feedback signal. This method is not suitable for real time implementation nor does it compensate for DC offsets.

Lohtia, Goud, and Englefield (IEEE PACRIM 1993 Conference Proceedings, Victoria, May 19–21, 1993, Vol. II, pp. 447–450) defined a nonlinear model of the vector modulator and proposed a technique to assess five unknown model variables by solving a set of five independent nonlinear equations based on five output power measurements. The set of nonlinear equations is solved using a nonlinear root finding technique. However, nonlinear modeling and solving a set of nonlinear equations, possibly leads to convergence problems.

In U.S. Pat. No. 5,387,883, issued Feb. 7, 1995 to Ueda, a quadrature modulator having controlled phase shifter is described. However, the modulator compensates only for phase imbalance. The modulator is fed with calibration signals during non-transmission periods of time.

In U.S. Pat. No. 5,293,406, issued Mar. 8, 1994 to Suzuki, a quadrature amplitude modulator with distortion compensation is disclosed. Again, the modulator works during non-transmission periods of time, and relies on the use of various calibration signals. Furthermore, sequential compensation is not likely to warrant full compensation due to a correlation between gain and phase imbalances.

In U.S. Pat. No. 5,663,691, issued Sep. 2, 1997, to Kowalik et al., an estimator for estimating an operating defect in a quadrature modulator, and a modulation stage using the estimator, are described. In this approach, the instantaneous output signal power is multiplied with the base band I and Q signals, the product is integrated to get an indication of the phase imbalances and DC offsets. However, there is no amplitude imbalance compensation and/or estimation. Most likely this technique utilizes a manual calibration process.

It would be highly advantageous to provide a system and method that overcome the limitations and drawbacks of the prior art.

OBJECT OF THE INVENTION

It is an object of the instant invention to provide a calibration method of determining pre-distortion coefficients to be applied to in-phase (I) and quadrature (Q) signals feeding a direct transmitter in order to maximize local oscillator (LO) suppression, as well as to maximize unwanted sideband suppression, the pre-distortion coefficients being used to adjust the relative phase and gain between the I and Q signals as well as DC offsets of the I and Q signals, the proposed technique not involving any approximation on the values of the pre-distortion coefficients.

It is also an object of the instant invention to provide a calibration method that is fully adaptive, thus allowing the use of a low dynamic range in the feedback circuit.

It is further an object of the instant invention to provide a calibration method that is able to track and correct changes over times as they occur.

It is another object of the instant invention to provide a calibration method for adaptive determination of gain and phase imbalances and DC offsets, using a least-mean-square (LMS) or recursive-least-square (RLS) based process, and using a truly mapped linear model without any approximation.

It is further another object of the instant invention to provide a calibration method for adaptive estimation based on an algorithm, which does not rely on contiguous samples of the output signal power, thus allowing for a low sampling rate.

It is yet another object of the instant invention to provide an apparatus for providing a carrier modulated signal, in which the I and Q channel signals have been pre-distorted for local oscillator as well as unwanted sideband signal suppression the pre-distortion coefficients obtained applying an algorithm based on a truly mapped linear model without any approximations.

SUMMARY OF THE INVENTION

In accordance with an aspect of the instant invention, there is provided a method for self-calibrating a vector modulator. The method includes a step of determining pre-distortion coefficients in dependence upon an in-phase signal, a quadrature signal, and an output envelope of an RF signal. The method further comprises the steps of transforming a value representative of an output envelope represented in a nonlinear domain into a value representative of the output envelope represented in a linear domain, determining a parameter vector x as a solution of a linear equation within the linear domain, and determining the pre-distortion coefficients from the parameter vector x.

In accordance with another aspect of the instant invention, there is provided a compensating quadrature modulator for self-calibrating a vector modulation process, the compensating quadrature modulator comprising: an I-signal transmit chain for pre-distorting and transmitting an in-phase signal, a Q-signal transmit chain for pre-distorting and transmitting a quadrature signal, a vector modulator for modulating the in-phase signal and the quadrature signal and for providing an analog RF output signal, an envelope detector coupled to the vector modulator output for detecting the analog RF output signal and for providing an analog envelope of the RF output signal, an analog-to-digital converter coupled to the envelope detector for receiving the analog envelope RF output signal and for converting the received signal into a digital envelope of an RF output signal, and a digital signal processor for determining at least a digital signal pre-distortion coefficient by which signals in one of the I-signal transmit chain and the Q-signal transmit chain are pre-distorted, the digital signal processor being coupled to the analog-to-digital converter, and being coupled to the I-signal transmit chain and the Q-signal transmit chain. The digital signal processor comprises circuitry for performing the steps of transforming a value representative of an output envelope represented in a non-linear domain into a value representative of the output envelope represented in a linear domain, determining a parameter vector x as a solution of a linear equation within the linear domain, and determining the pre-distortion coefficients from the parameter vector x.

BRIEF DESCRIPTION OF THE DRAWINGS

Embodiments of the instant invention will now be described in conjunction with the following drawings, in which FIG. 1 displays a functional block diagram of a prior art direct digital transmitter (DDT) 1;

FIG. 7, shows a transmit spectrum of a quadrature-modulated signal with correction of gain/phase imbalances and DC offsets according to the instant invention.

DETAILED DESCRIPTION OF THE INVENTION

The instant invention is now described in detail. In particular, the instant invention will be demonstrated with an exemplary model developed for a square law power detector. A person of skill in the art will appreciate that the instant invention is easily modified using models based on other type of envelope detectors, such as for example linear envelope detectors and logarithmic envelope detectors. It is understood that power is a representation of the envelope of a signal.

Figure 1:
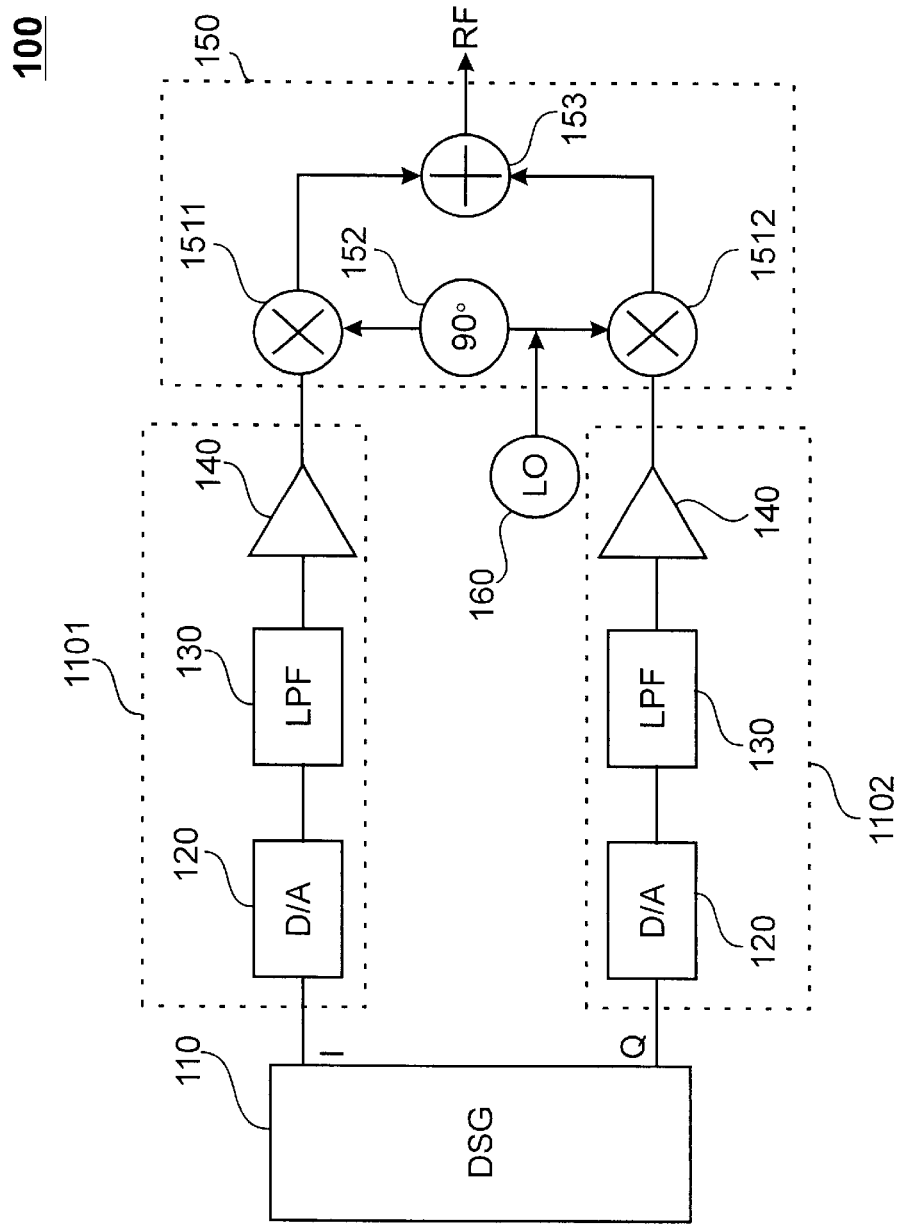

Referring to FIG. 1, a functional block diagram of a prior art direct digital transmitter (DDT) 100 is shown. The direct digital transmitter (DDT) 100 comprises a digital signal generator (DSG) 110, which generates an in-phase (I) and a quadrature (Q) signal. Two transmit chains, the I-signal chain 1101 and the Q-signal chain 1102, each comprises a Digital-to-Analog (D/A) converter 120, a low pass filter (LPF) 130, and an amplifier 140. The I and Q signals are fed through the I and Q signal chains to a vector modulator 150. Further, a local oscillator (LO) 160 is connected to the vector modulator 150. A signal generated by the local oscillator is ed to the vector modulator 150, where it is split into two orthogonal signals in the splitter/phase-shifter 152. A mixer 1511 multiplies the in-phase signal I by the LO-signal, whereas a second mixer 1512 multiplies the quadrature signal Q by a 90°-shifted LO signal. The mixed signals are then summed in the adder 153 to form an RF output signal. Of course, the design of the vector modulator as described above constitutes only one specific design of the vector modulator. A person of skill in the art easily envisions other designs for the vector modulator. For example instead of phase shifting the LO by 90°, the Q signal is shifted by 90°. Further alternately, the I-signal LO is phase shifted by −45° and the Q-signal LO is phas shifted by 45°. These considerations also apply to vector modulators of the instant invention.

In order for the direct digital transmitter (DDT) 100 to perform properly, the transmit chains 1101 and 1102 are preferably essentially matched in gain and phase, and their DC offsets are preferably such as expected by the vector modulator 150. In addition, the splitter/phase shifter 152 has to provide a 90°-phase shift and the mixers 1511 and 1512 responses have to be matched in gain and phase. These conditions are difficult to achieve, especially when the direct digital transmitter 100 is operated at microwave frequencies.

In practice, the input signals fed to the vector modulator 150 are tuned to compensate for imperfections in the direct digital transmitter (DDT) 100. The tuning involves adjusting the relative amplitude and phase of the I and Q signals and adjusting the DC offset of the I and Q signals. The tuning represents a calibration process. The adjustment is optionally done manually, if a single calibration process is sufficient for proper functioning of the DDT. The adjustment is optionally automated for frequent or in use calibrations of the DDT. Alternately, the tuning is achieved by pre-distorting the I and Q signals in the digital signal generator to achieve same results.

Figure 2:
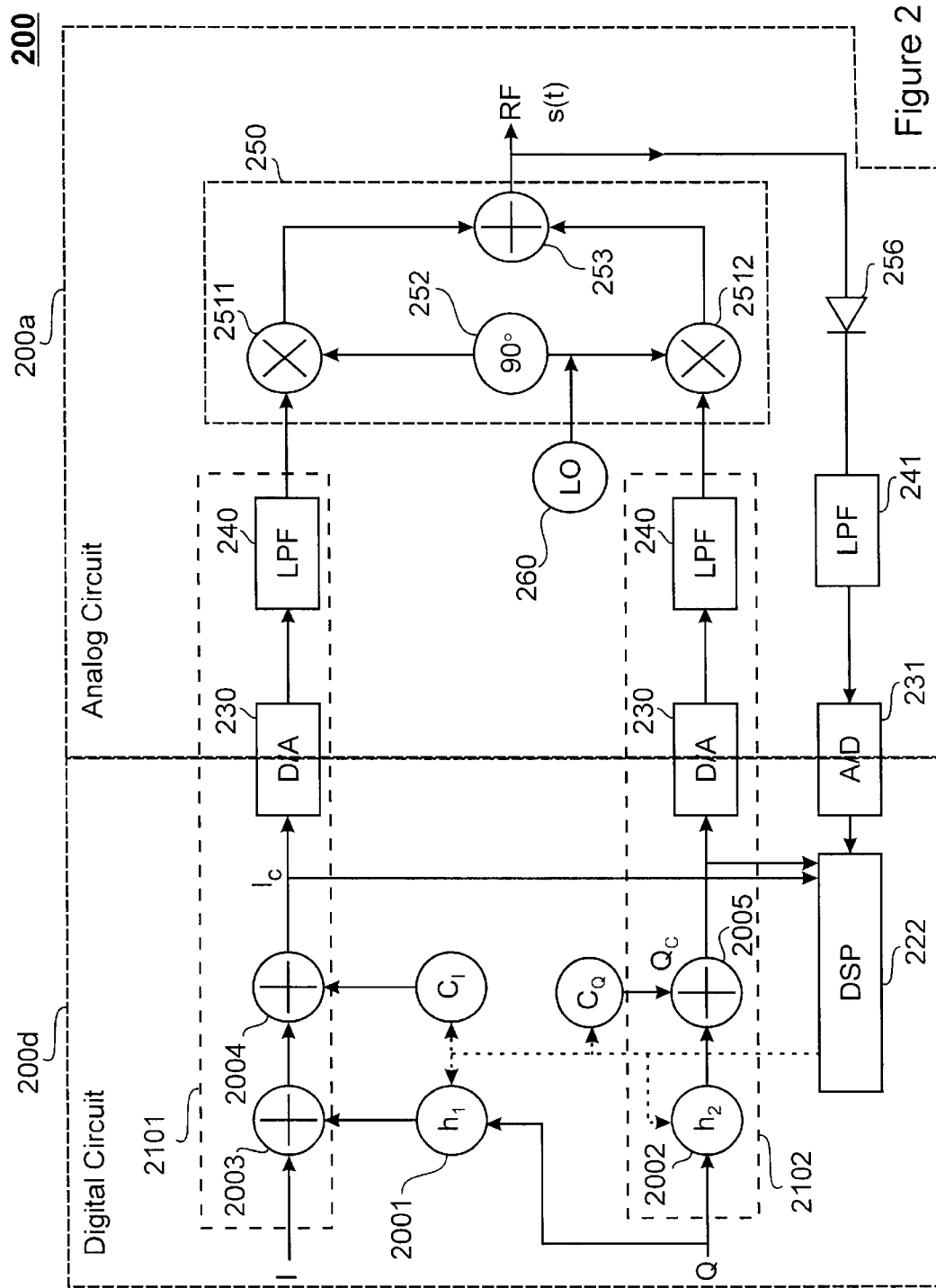
FIG. 2 displays functional block diagram of a compensating quadrature modulator according to the instant invention.

Referring now to FIG. 2, shown is a functional block diagram of a compensating quadrature modulator 200 according to the instant invention. The compensating quadrature modulator 200 corrects I and Q signals for gain/phase imbalances and DC offsets. The correction for gain/phase imbalances and DC offsets represents a calibration process. The compensating quadrature modulator comprises a digital circuit 200d, an analog circuit 200a, as well as an I-signal transmit chain or I-channel 2101 and a Q-signal transmit chain or Q-channel 2102. The I- and and Q-channels extend across the digital and analog circuits 200d and 200a. Gain and phase of the Q-channel relative to the I-channel are denoted as α and φ, while $C_I$ and $C_Q$ are DC offsets of the I and Q channels, respectively. Gain and phase corrections for the Q-channel are achieved by scaling the Q-channel signal by a factor $h_2$ and corrected for DC offset by $C_Q$. The I-channel is offset by a scaled Q-channel signal, the scaling factor being $h_1$, and corrected for DC offset by $C_I$. The factors $h_1$ and $h_2$ are defined as $h_1=\tan(\phi)$ and $h_2=1/\alpha\cos(\phi)$.

The I-signal and Q-signal are provided to the I-channel and to the Q-channel, respectively. The signal Q is split, and multiplied by the factor $h_1$ in the multiplier 2001. This modified Q-signal is added to the I-signal in the adder 2003. The now modified I-signal is corrected for DC offset by subtracting $C_I$ in the adder 2004. The result of these operations is a pre-distorted signal $I_c$. In the Q-channel, the Q-signal is multiplied by the factor $h_2$ in the multiplier 2002. From the multiplied signal the component $C_Q$ is subtracted in the adder 2005, resulting in a pre-distorted signal $Q_c$. The pre-distorted signals are passed through digital/analog converters (D/A) 230, low-pass filters (LPF) 240, and are fed to vector modulator 250. Optionally, the pre-distorted signals are amplified in an amplifier (not shown) before provided to the vector modulator 250. Further, a local oscillator 260 is coupled to the vector modulator 250. A splitter/phase shifter 252, mixers 2511 and 2512, and an adder 253 operate in a similar fashion as those described for the vector modulator 150. The vector modulator 250 produces an RF signal s(t), part of which is fed through a feedback circuit consisting of an envelope detector coupled to the vector modulator, the envelope detector shown as a diode 256, an LPF 241, an analog-to-digital converter 231, and to a digital signal processor (DSP) 222. Optionally, an amplifier is integrated into the feedback (not shown). Also fed to the DSP 222 are the pre-distorted signals $I_c$ and $Q_c$. The DSP 222 functions as a parameter estimator, and generates the coefficients $C_I$, $C_Q$, $h_1$ and $h_2$. Thus, the compensating quadrature modulator 200 allows for adaptive determination of gain/phase imbalances and DC offsets, and adjusts the correction factors according to the current conditions of the analog circuit 200a. Thus, the circuit is able to take into account variations in ambient temperature and the like occurring during circuit operation. The compensating quadrature modulator 200 operates as a self-calibrating device.

The principles of the layout of the digital circuit 200d of the compensating quadrature modulator 200 are apparent when analyzing underlying concepts for circuit design. In the following, a mathematical model, on which the instant embodiment is based, is derived. A carrier-modulated signal s(t) with gain/phase imbalances and DC offset distortion is modeled as follows:

$$s(t) = (I(t) + C_I)\cos(\omega t) - \alpha(Q(t) + C_Q)\sin(\omega t + \phi) \quad (1)$$

In Equation 1, $I(t)$ and $Q(t)$ represent the I and Q modulating signals, and $\omega$ denotes the carrier frequency. As introduced above, $\alpha$ and $\phi$ represent the total gain and phase imbalances between I and Q channels, while $C_I$ and $C_Q$ are total DC offsets in I and Q channels, respectively. These imbalances and offsets are present in both the transmit chains and the vector modulator. Using a trigonometric identity, Equation 1 is expressed as $$s(t) = U(t)\cos(\omega t) - V(t)\sin(\omega t) \quad (2)$$

Here, $U(t)$ and $V(t)$ are defined by:

$$\begin{cases} U(t) = (I(t) - C_I) - \alpha(Q(t) + C_Q)\sin(\phi) \\ V(t) = \alpha(Q(t) + C_Q)\cos(\phi) \end{cases} \quad (3)$$

Based on the definitions given in Equations 1–3, a method for determining the gain and phase imbalances $\alpha$ and $\phi$, as well as the DC offsets $C_I$ and $C_Q$ is described below. To this end, the instantaneous output power p(t) of the vector modulator, which is defined as:

$$p(t) = U^2(t) + V^2(t) \quad (4)$$

is expressed in terms of $U(t)$ and $V(t)$, and after straightforward manipulation is written as $$p(t) = I^2(t) + (2C_I - 2\alpha C_Q \sin(\phi))I(t) - 2\alpha\sin(\phi)I(t)Q(t) + \quad (5)$$
$$(2\alpha^2 C_Q - 2\alpha C_I \sin(\phi))Q(t) + \alpha^2 Q^2(t) +$$
$$(C_I^2 + \alpha^2 C_Q^2 - 2\alpha C_I C_Q \sin(\phi))$$

Considering N sample measurements with a sampling interval of $\Delta\tau$, $\Delta\tau$ defining the time elapsed between measurement samples, and assuming that a measurement circuit has a gain G, it is possible to express the $n^{th}$ sampled power measurement p(n), with $1 \leq n \leq N$, as:

$$p(n) = G \cdot p(n) + w(n) + \delta \quad (6)$$

In Equation 6, $w(n)$ represents measurement noise, including thermal noise in the circuit and quantization noise. The thermal noise is generally modeled as white zero-mean Gaussian noise, whereas the quantization noise is generally modeled as a white zero-mean uniformly distributed noise. Further, in Equation 6, $\delta$ represents the DC bias in the measurement circuit. The measurement gain G is introduced to account for gain uncertainty in the measurement circuit.

For further description, it is helpful to make use of an average operator $E\{\ \}$. The average operator $E\{\ \}$ returns an average value of a set of $v(n)$ variables, when operating on $v(n)$, indicated as $E\{v(n)\}$. Applying the average operator to the power measurement p(n) then results in an average power measurement or mean power measurement $$\sigma_p^2:$$

$$\sigma_p^2 = E\{p(n)\} \quad (7)$$
$$= E\{I^2(n)x_1 + I(n)x_2 + I(n)Q(n)x_3 + Q(n)x_4 + Q^2(n)x_5 +$$
$$x_6 + \delta + w(n)\}$$
$$= \sigma_I^2 x_1 + \mu_I x_2 + \gamma x_3 + \mu_Q x_4 + \sigma_Q^2 x_5 + x_6 + \delta$$

In Equation 7, the following variables denoting the result of an averaging operation have been introduced:

$$\mu_I = E\{I(n)\},\ \mu_Q = E\{Q(n)\},\ \sigma_I^2 = E\{I^2(n)\},\ \sigma_Q^2 = E\{Q^2(n)\}\text{ and}$$
$$\gamma = E\{I(n)Q(n)\}.$$

Further, $x_n$; $1 \leq n \leq 6$, are components of a "gain vector" x defined as $$x_1 = G,\ x_2 = (2C_I - 2\alpha C_Q \sin(\phi))G,\ x_3 = -2\alpha\sin(\phi)G,$$
$$x_4 = (2\alpha^2 C_Q - 2\alpha C_I \sin(\phi))G,\ x_5 = \alpha^2 G,\text{ and}$$
$$x_6 = (C_I^2 + \alpha^2 C_Q^2 - 2\alpha C_I C_Q \sin(\phi))G.$$

When subtracting the mean power measurement $$\sigma_p^2$$

from the power measurement p(n), an AC-coupled power measurement $p_0(n)$ is obtained. The AC-coupled power measurement is therefore given as:

$$p_0(n) = p(n) - \sigma_p^2 = a^T(n)x + w(n) \quad (8)$$

In Equation 8, the superscript "T" as usual denotes a matrix/vector transpose, and the vectors a(n) and x are defined as:

$$a(n) = \begin{pmatrix} I^2(n) - \sigma_I^2 \\ I(n) - \mu_I \\ I(n)Q(n) - \gamma \\ Q(n) - \mu_Q \\ Q^2(n) - \sigma_Q^2 \end{pmatrix};\ x = \begin{pmatrix} x_1 \\ x_2 \\ x_3 \\ x_4 \\ x_5 \end{pmatrix}.$$

The vector x now represents a five-dimensional parameter vector with the components $x_n$; $1 \leq n \leq 5$, as defined in the context of Equation 7. The vector a represents a DC-corrected vector of components for the I and Q channel values, intensities, and cross coupling.

The procedure outlined above allows one to transform a nonlinear equation, Equation 5, into a linear equation, Equation 8. A closer inspection reveals that Equation 5 is nonlinear in $C_I$, $C_Q$, $\alpha$, and $\phi$, whereas Equation 8 is linear in $x_n$; $1 \leq n \leq 5$. Therefore, in order to calculate the pre-distortion coefficients $\alpha$, $\phi$, $C_I$, $C_Q$, the linear Equation 8 is solved to result values for $x_n$; $1 \leq n \leq 5$, from which then the pre-distortion coefficients are obtained.

The derived linearization process simplifies the determination procedure for the pre-distortion coefficients. Given Equation (8), the problem is reduced to estimating the unknown parameter x from the two observable sets $\{a_1(n)\}$ and $\{p_0(n)\}$. A least-square (LS) based technique is used to perform this task in the present exemplary embodiment. Optionally, different mathematical techniques are used to obtain a solution for Equation 8.

The above analysis is based on correlated I and Q signals having non-zero means and equal or unequal powers. Possibly, the I and Q signals are uncorrelated, with zero-means and equal power. In this case, one has $$\gamma = \mu_I = \mu_Q = 0 \text{ and } \sigma_I^2 = \sigma_Q^2.$$

Thus, the case of uncorrelated Q and I signals is a special case of correlated I and Q signals, and the above derived formulation is therefore applicable to uncorrelated signals as well.

A method for determining the parameter vector x is outlined below. It is helpful to define an estimation error as:

$$e(n) = p_0(n) - a^T(n)x, \text{ for } n=1,2,\ldots N \qquad (9)$$

Given a corresponding error vector $e=(e(1),e(2),\ldots,e(N))^T$, and a measurement vector $p=(p_0(1), p_0(2), \ldots, p_0(N))^T$, the sum of the squared errors is written as:

$$\varepsilon(x) = \sum_{n=1}^{N} |e(n)|^2 = (p - Ax)^T(p - Ax) \qquad (10)$$

In Equation 10, A is a 5-by-N matrix $A=(a(1),a(2),\ldots,a(N))^T$, formed by DC-corrected vectors $a(n)$; $1 \leq n \leq N$. In a least square (LS) method used to solve Equation 8, the parameter vector x is chosen to minimize the sum of the squared errors. An LS solution to the above problem is found in standard textbooks, see for example S. Haykin, *Adaptive Filter Theory*, 3$^{rd}$ Edition, Prentice-Hall, New Jersey, 1996. The LS solution is given in equation 11.

$$x = (A^T A)^{-1} A^T p \qquad (11)$$

Haykin has demonstrated that the above estimate of x is a best linear unbiased estimate, when the measurement noise w(n) is a zero-mean white noise. Since the measurement noise in cases, to which the instant invention applies, is most likely a zero-mean white noise, the LS solution is favorably applied in the instant invention.

Having obtained x, provided are values for the gain/phase imbalance parameters $\alpha$ and $\phi$, and the DC offset parameters $C_I$ and $C_Q$, which in turn are utilized to compute the pre-distortion coefficients for local oscillator and undesired sideband suppression. The values are provided according to the definitions of $x_i$. Corresponding solutions are given in Equations 12–14:

$$\alpha = \sqrt{x_5/x_1} \qquad (12)$$

$$\phi = \sin^{-1}\left(-\frac{x_3}{2\sqrt{x_1 x_5}}\right) \qquad (13)$$

$$\begin{pmatrix} C_I \\ C_Q \end{pmatrix} = \begin{pmatrix} 2G & -2\alpha\sin(\phi)G \\ -2\alpha\sin(\phi)G & 2\alpha^2 G \end{pmatrix}^{-1} \begin{pmatrix} x_2 \\ x_4 \end{pmatrix} \qquad (14)$$

The pre-distorted I and Q channel signals, denoted as $I_c(n)$ and $Q_c(n)$, are obtained from the inverse system to the signal model of Equation 3:

$$\begin{pmatrix} I_c(n) \\ Q_c(n) \end{pmatrix} = \begin{pmatrix} 1 & -\alpha\sin(\phi) \\ 0 & \alpha\cos(\phi) \end{pmatrix}^{-1} \begin{pmatrix} I(n) \\ Q(n) \end{pmatrix} - \begin{pmatrix} C_I \\ C_Q \end{pmatrix} \qquad (15)$$

The inverse matrix in Equation 15 is written as:

$$\begin{pmatrix} 1 & -\alpha\sin(\phi) \\ 0 & \alpha\cos(\phi) \end{pmatrix}^{-1} = \begin{pmatrix} 1 & \tan(\phi) \\ 0 & 1/\alpha\cos(\phi) \end{pmatrix} \qquad (16)$$

and the following set of equations to determine the pre-distorted signals $I_c(n)$ and $Q_c(n)$ results from Equations 15 and 16:

$$\begin{cases} I_c(n) = I(n) + \tan(\phi) \cdot Q(n) - C_I \\ Q_c(n) = (1/\alpha\cos(\phi)) \cdot Q(n) - C_Q \end{cases} \qquad (17)$$

The relations for $I_c(n)$ and $Q_c(n)$ derived in Equation 17 constitute a basis for the design of the digital circuit 200d of the compensating quadrature modulator 200, the digital circuit 200d modulating the I(t) and Q(t) input signals. According to the instant embodiment, the pre-distorted signals, $I_c(n)$ and $Q_c(n)$, are converted to analog signals, filtered and applied to the vector modulator of Equation 1.

To verify that the above pre-distortion indeed removes the effects of any gain/phase imbalances and DC offsets at the modulator output, in the set of linear equations given in Equation 3, I(n) and Q(n) are replaced by $I_c(n)$ and $Q_c(n)$, yielding:

$$\begin{pmatrix} U(n) \\ V(n) \end{pmatrix} = \begin{pmatrix} 1 & -\alpha\sin(\phi) \\ 0 & \alpha\cos(\phi) \end{pmatrix}\left(\begin{pmatrix} I_c(n) \\ Q_c(n) \end{pmatrix} + \begin{pmatrix} C_I \\ C_Q \end{pmatrix}\right) \qquad (18)$$

$$= \begin{pmatrix} 1 & -\alpha\sin(\phi) \\ 0 & \alpha\cos(\phi) \end{pmatrix}\left(\begin{pmatrix} 1 & -\alpha\sin(\phi) \\ 0 & \alpha\cos(\phi) \end{pmatrix}^{-1}\begin{pmatrix} I(n) \\ Q(n) \end{pmatrix} - \begin{pmatrix} C_I \\ C_Q \end{pmatrix} + \begin{pmatrix} C_I \\ C_Q \end{pmatrix}\right)$$

$$= \begin{pmatrix} 1 & -\alpha\sin(\phi) \\ 0 & \alpha\cos(\phi) \end{pmatrix}\begin{pmatrix} 1 & -\alpha\sin(\phi) \\ 0 & \alpha\cos(\phi) \end{pmatrix}^{-1}\begin{pmatrix} I(n) \\ Q(n) \end{pmatrix}$$

$$= \begin{pmatrix} I(n) \\ Q(n) \end{pmatrix}$$

It follows from Equations 2 and 18 that after the pre-distortion, the effects of any gain/phase imbalances and DC offsets are eliminated from the output of the vector modulator.

Equations 11–14 and 17 form a basis for a procedure for correcting gain/phase imbalance and DC offset. It is possible to solve Equation 11 directly by first taking a set of N measurements, and then carrying out matrix multiplications and inversion. The direct implementation is suitable for a stationary environment where the gain/phase imbalances and DC offsets do not change rapidly, and an adaptiveness other than a high adaptiveness is possibly sufficient.

However, if the gain/phase imbalances and DC offsets change rapidly with time, it is advantageous to have an adaptive implementation. Although the present implementation is possibly operated repeatedly from time to time to update the pre-distortion coefficients according to changes of the gain/phase imbalances and DC offsets, preferred adaptive solutions are for example a least-mean-square (LMS) process, which is suitable for high-speed transmission systems; and a recursive least-squares (RLS) process, which, compared to the LMS process, performs favorably in terms of convergence and residual error but which is accompanied by an increase in computational cost.

Figure 3:
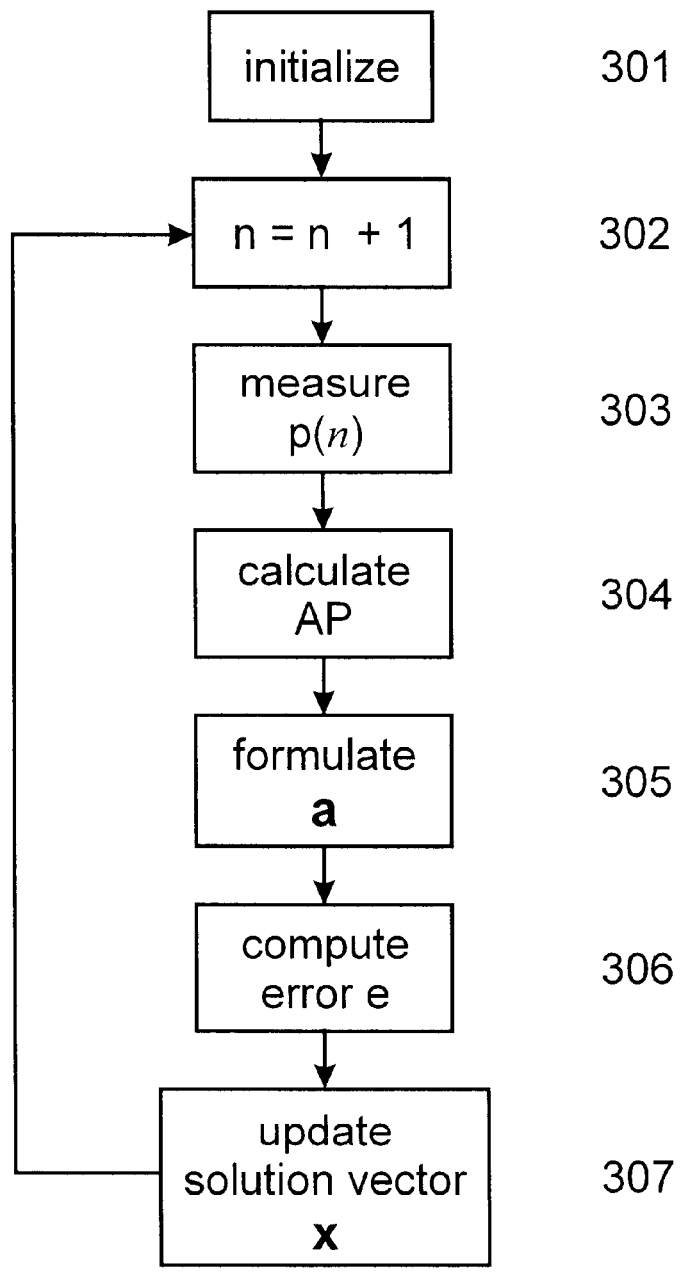
FIG. 3 shows a flow chart for an LMS-based implementation of an algorithm according to the instant invention.

Referring to an embodiment of the instant invention, shown is in FIG. 3 a flow chart 3 for an LMS-based implementation of a process according to the instant invention. In this process, the parameter vector x is obtained over time in an iterative fashion. For each x, a set of pre-distortion coefficients $\alpha$, $\phi$, $C_I$ and $C_Q$ is calculated according to Equations 12–14. In a first step 301, relevant parameters are initialized. Preferably, at the initial stage, n=0, components of the initial parameter vector x(0), $x_i(0)$; $1 \leq i \leq 5$, as well as other auxiliary parameters (AP) are initialized with an initial value, the initial value being in the form of a zero value, thus $$x_i(0) = \mu_I(0) = \mu_Q(0) = \sigma_I^2(0) = \sigma_Q^2(0) = \sigma_P^2(0) = \gamma(0) = 0.$$

Further, a step size $\mu$ is defined, preferably in dependence of a total power value $\eta$, $\eta$ being the power in the DC-corrected component vector a(n), such that $0 < \mu < 2/\eta$, and an increment value $\xi$ is selected, $\xi$ being a small positive number in the range of $0 < \xi \leq 0.01$. In a next step 302, the interval counter n is incremented as n=n+1. A power measurement p(n) is taken, step 303, and auxiliary parameters (AP) are calculated, step 304. The AP are determined according to the following set of equations:

$$\begin{cases} \mu_I(n) = \xi(I_c(n) - \mu_I(n-1)) + \mu_I(n-1) \\ \sigma_I^2(n) = \xi(I_c^2(n) - \sigma_I^2(n-1)) + \sigma_I^2(n-1) \\ \gamma(n) = \xi(I_c(n)Q_c(n) - \gamma(n-1)) + \gamma(n-1) \\ \mu_Q(n) = \xi(Q_c(n) - \mu_Q(n-1)) + \mu_Q(n-1) \\ \sigma_Q^2(n) = \xi(Q_c^2(n) - \sigma_Q^2(n-1)) + \sigma_Q^2(n-1) \\ \sigma_P^2(n) = \xi(p(n) - \sigma_P^2(n-1)) + \sigma_P^2(n-1) \end{cases} \quad \text{(A-1)}$$

Next, the DC-corrected component vector a is formulated, step 305, a being defined in Equation A-2.

$$a = \begin{pmatrix} I_c^2(n) - \sigma_I^2(n) \\ I_c(n) - \mu_I(n) \\ I_c(n)Q_c(n) - \gamma(n) \\ Q_c(n) - \mu_Q(n) \\ Q_c^2(n) - \sigma_Q^2(n) \end{pmatrix} \quad \text{(A-2)}$$

An error e is computed, step 306, and the solution vector is updated, step 307. Equations governing steps 306 and 307 are Equations A-3 and A-4, respectively.

$$e = (p(n) - \sigma_P^2(n)) - x^T(n)a \quad \text{(A-3)}$$

$$x(n+1) = x(n) + \mu \cdot e \cdot a \quad \text{(A-4)}$$

After each iteration, a new estimate of x is obtained. Then, Equations 12–14 are used to compute a set of $\alpha$, $\phi$, $C_I$ and $C_Q$ which are used to update the pre-compensation circuit. The method returns to step 302, and the cycle is repeated. It is apparent from the present description that the process according to the instant embodiment as outlined in flow chart 3 is a self-calibration method.

Figure 4:
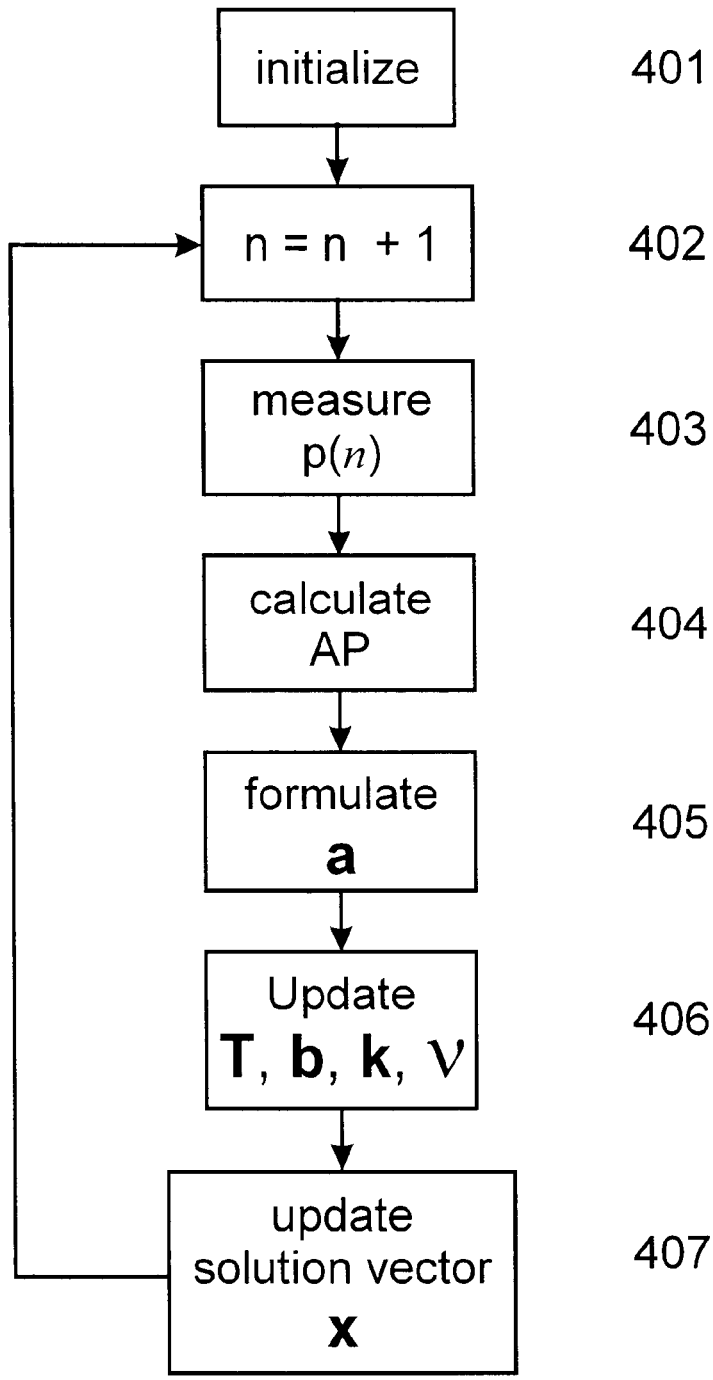
FIG. 4 shows a flow chart for an RLS-based implementation of an algorithm according to the instant invention.

Referring now to FIG. 4, shown is a flow chart 4 for an RLS-based implementation of a process according to the instant invention. In a first step 401, relevant parameters are initialized. Preferably, at the initial stage, n=0, components of the initial parameter vector x(0), $x_i(0)$; $1 \leq i \leq 5$, as well as other auxiliary parameters (AP) are initialized with a pre-determined value in the form of a zero value, thus $$x_i(0) = \mu_I(0) = \mu_Q(0) = \sigma_I^2(0) = \sigma_Q^2(0) = \sigma_P^2(0) = \gamma(0) = 0.$$

Further, a matrix T is initialized as $\delta^{-1} \cdot U$, with U denoting an identity 5×5 matrix and $\delta$ being a small positive constant, a constant $\lambda$ is chosen as positive number close to 1, and an increment value $\xi$ is selected, $\xi$ being a small positive number in the range of $0 < \xi \leq 0.01$. In a next step 402, the interval counter n is incremented as n=n+1. A power measurement p(n) is taken, step 403, and auxiliary parameters (AP) are calculated, step 404. The AP are determined according to Equation A-1. The DC-corrected component vector a is formulated, step 405, as defined in Equation A-2. In step 406, the matrix T, vectors b and k, as well as parameter v are updated according to conditions for updating given in Equation A-5:

$$\begin{cases} T(n) = \lambda^{-1} T(n-1) - k \cdot b \\ b = \lambda^{-1} \cdot T \cdot (n-1) \cdot a \\ k = [1 + a^T b]^{-1} \cdot b \\ v = (p(n) - \sigma_P^2(n)) - x^T(n-1)a \end{cases} \quad \text{(A-5)}$$

In step 407, a solution vector x is updated, following Equation A-6:

$$x(n) = x(n-1) + v \cdot k \quad \text{(A-6)}$$

After each iteration, a new estimate of x is obtained. Then, Equations 12–14 are used to compute a set of $\alpha$, $\phi$, $C_I$ and $C_Q$ which are used to update the pre-compensation circuit. The method returns to step 402, and the cycle is repeated. It is apparent from the present description that the process according to the instant embodiment as outlined in flow chart 4 is a self-calibration method.

The methods described above are outlined for I and Q channel signals that are possibly correlated, with non-zero means and unequal powers. Alternatively, the I and Q channel signals are uncorrelated, zero-mean and equal-powered. In this case, the following relations for the auxiliary parameters hold:

$$\gamma = \mu_I = \mu_Q = 0, \text{ and } \sigma_I^2 = \sigma_Q^2.$$

Under such circumstances, the updating equations for $\gamma(n)$, $\mu_I(n)$, and $\mu_Q(n)$ are removed from Equation A-1, and the updating equations for $$\sigma_I^2(n) \text{ and } \sigma_Q^2(n)$$

in Equation A-1 are combined into one single equation.

Methods according to the instant invention are accurate methods for determining pre-distortion coefficients. The methods do not involve a step of approximation. Quantization and noise possibly affect precision of the pre-distortion coefficients. Precision is possibly influenced according to a choice of instrumentation for exercising the methods. However, quantization and noise do not affect the accuracy of the pre-distortion coefficients. The methods according to the instant invention are accurate per se.

Self-calibration methods according to first embodiment of the instant invention have been evaluated through computer simulations of a coherent quadrature phase shift keying (QPSK) communication system. In the present example, the vector modulator output power was sampled at a rate of 4 samples/symbol, and an additive white Gaussian noise (AWGN) channel model was used in the simulation. Essentially perfect symbol timing and carrier synchronization at the receiver was assumed to focus on the effects of gain/phase imbalances and DC offset compensation process. The following parameter values were used for the gain/phase imbalances and DC offsets in the transmitter: $\alpha=0.95$, $\phi=5°$, $C_I=-0.05$ and $C_Q=0.05$.

Figure 5:
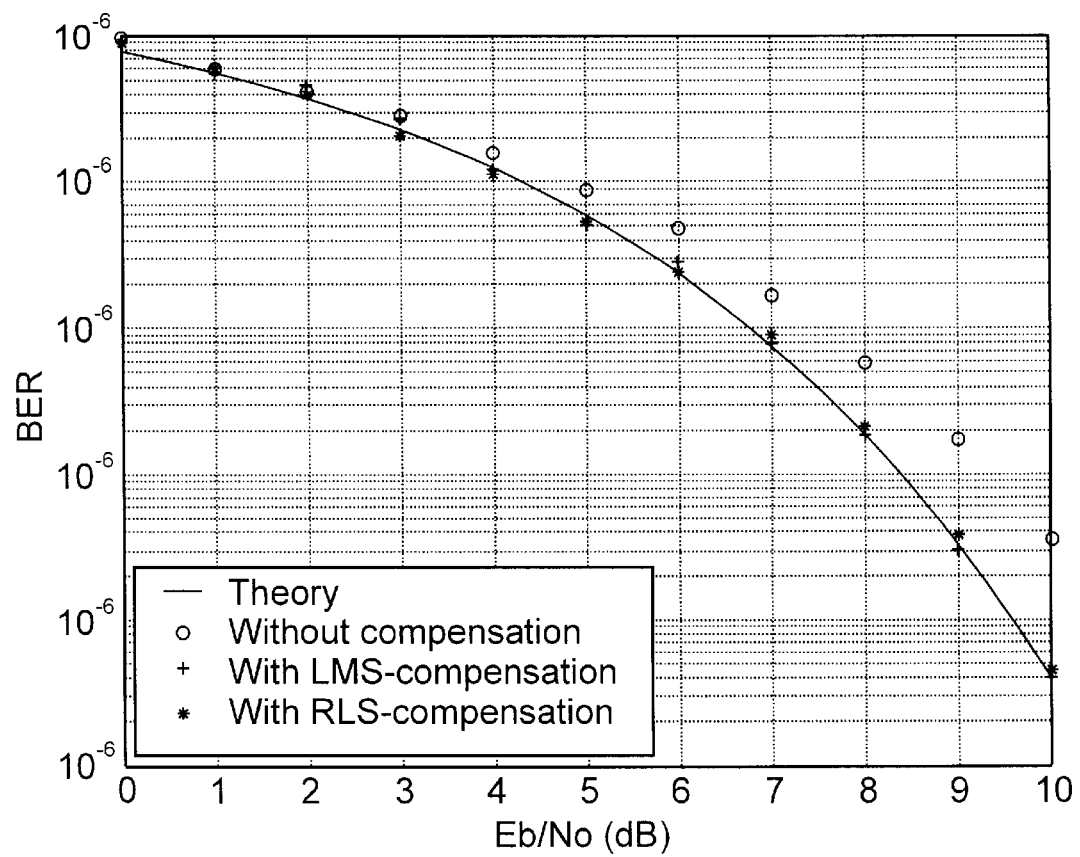
FIG. 5 displays BER performance curves of a simulated QPSK communication system with and without compensation according to the instant invention.

Referring now to FIG. 5, shown is a bit-error rate (BER) performance of the QPSK communication system with and without compensation according to the above embodiment. The BER were calculated as a ratio of 100 bit errors over a number of bits transmitted. It is observed that the gain/phase imbalances and DC offsets deteriorate the BER performance while both proposed compensation techniques eliminate their effects and restore the BER performance to acceptable levels. It is also noted that the gain/phase imbalances and DC offsets impact more on the BER performance as the ratio of energy per bit over noise power density ($E_b/N_o$) increases since at low $E_b/N_o$ the channel noise is dominant. The curves displayed in FIG. 5 illustrate that the correction according to the above-described LMS and RLS processes essentially restore the BER value to the theoretically undisturbed value.

In another embodiment of the instant invention, instead of feeding pre-distorted I- and Q-signals to the digital signal processor, a set of known probing signals is applied to the vector modulator, and the associated envelope of the output signal is measured. For example, a trigger signal is provided to the digital signal processor to inform the digital signal processor that a specific training sequence is sent, and at least a set of known I- and Q-signals or probing signals is applied to the vector modulator. The probing signals are selected such that Q-channel gain $\alpha$, Q-channel phase offset $\phi$, as well as DC offsets $C_I$ and $C_Q$ are obtainable from a set of envelope measurements of the modulated output generated by the probing signals. In the subsequent derivation, the following average-operator obtained values are used:

$$\mu_I = E\{I(t)\}, \mu_Q = E\{Q(t)\}, \sigma_I^2 = E\{I^2(t)\},$$
$$\sigma_Q^2 = E\{Q^2(t)\} \text{ and } \gamma = E\{I(t)Q(t)\}.$$

Further, the gain vector components are now given as $x_n$; $0 \leq n \leq 5$, with individual terms $$x_1 = G, x_2 = (2C_I - 2\alpha C_Q \sin(\phi))G, x_3 = -2\alpha \sin(\phi)G,$$
$$x_4 = (2\alpha^2 C_Q - 2\alpha C_I \sin(\phi))G, x_5 = \alpha^2 G,$$
$$\text{and } x_0 = (C_I^2 + \alpha^2 C_Q^2 - 2\alpha C_I C_Q \sin(\phi))G.$$

The output power $p_1$ of the vector modulator in the case of known probing signals is expressed as $$p_t = \sigma_I^2 x_1 + \mu_I x_2 + \gamma x_3 + \mu_Q x_4 + \sigma_Q^2 x_5 + x_0 \quad (19)$$

When applying $I(t)=Q(t)=0$ to the vector modulator, and measuring an output power $p_0$, the vector component $x_0$ becomes:

$$x_0=p_0 \quad (20)$$

Setting $I(t)=\alpha\cos(\Omega t)$; $Q(t)=0$, $\alpha$ and $\Omega$ being known, and measuring a power $p_1$, a value for $x_1$ is obtained:

$$x_1=2(p_1-x_0)/\alpha^2 \quad (21)$$

From Equation 21, and from the definition of $x_1$, a value for the gain G is calculated. Setting now $Q(t)=\alpha\cos(\Omega t)$; $I(t)=0$, and measuring a power $p_2$, a value for $x_5$ becomes:

$$x_5=2(p_2-x_0)/\alpha^2 \quad (22)$$

The Q-channel gain $\alpha$ is then calculated according to Equation 12. When setting $I(t)=Q(t)=\alpha\cos(\Omega t)$, and measuring an output power $p_3$, a value for $x_3$ is obtained:

$$x_3=(2(p_3-x_0)/\alpha^2)-x_1-x_5 \quad (23)$$

The Q-channel phase offset $\phi$ is then calculated according to Equation 13. The DC offsets $C_I$ and $C_Q$ are obtained from a set of four symmetrical pairs of I- and Q-signal inputs each. Let $$a = \begin{pmatrix} \sigma_I^2 \\ \mu_I \\ x_0 \end{pmatrix}; b = \begin{pmatrix} \sigma_Q^2 \\ \mu_Q \\ x_0 \end{pmatrix}; p_{4-7} = \begin{pmatrix} p_4 \\ p_5 \\ p_6 \\ p_7 \end{pmatrix};$$

$$p_{8-11} = \begin{pmatrix} p_8 \\ p_9 \\ p_{10} \\ p_{11} \end{pmatrix}; D = \begin{pmatrix} 1 & 1 & 1 \\ 1/4 & 1/2 & 1 \\ 1/4 & -1/2 & 1 \\ 1 & -1 & 1 \end{pmatrix}$$

Providing the four symmetrical input signal pairs (1,0), (½,0), (−½,0), (−1/0) and measuring the power outputs $p_n$; $4 \leq n \leq 7$, Equation 24 is obtained:

$$D \cdot a = p_{4-7} \quad (24)$$

Similarly, providing the four symmetrical input signal pairs (0,1), (0,½), (0,−½), (0,−1) and measuring the power outputs $p_n$; $8 \leq n \leq 11$, Equation 25 is obtained:

$$D \cdot b = p_{8-11} \quad (25)$$

From the solutions of Equations 24 and 25, which result in the vector components of a and b, the DC offsets $C_I$ and $C_Q$ are obtained as:

$$C_X = -\mu_X/2\sigma_X^2; \text{ with subscript } X = I \text{ or } Q \quad (26)$$

Figure 6:
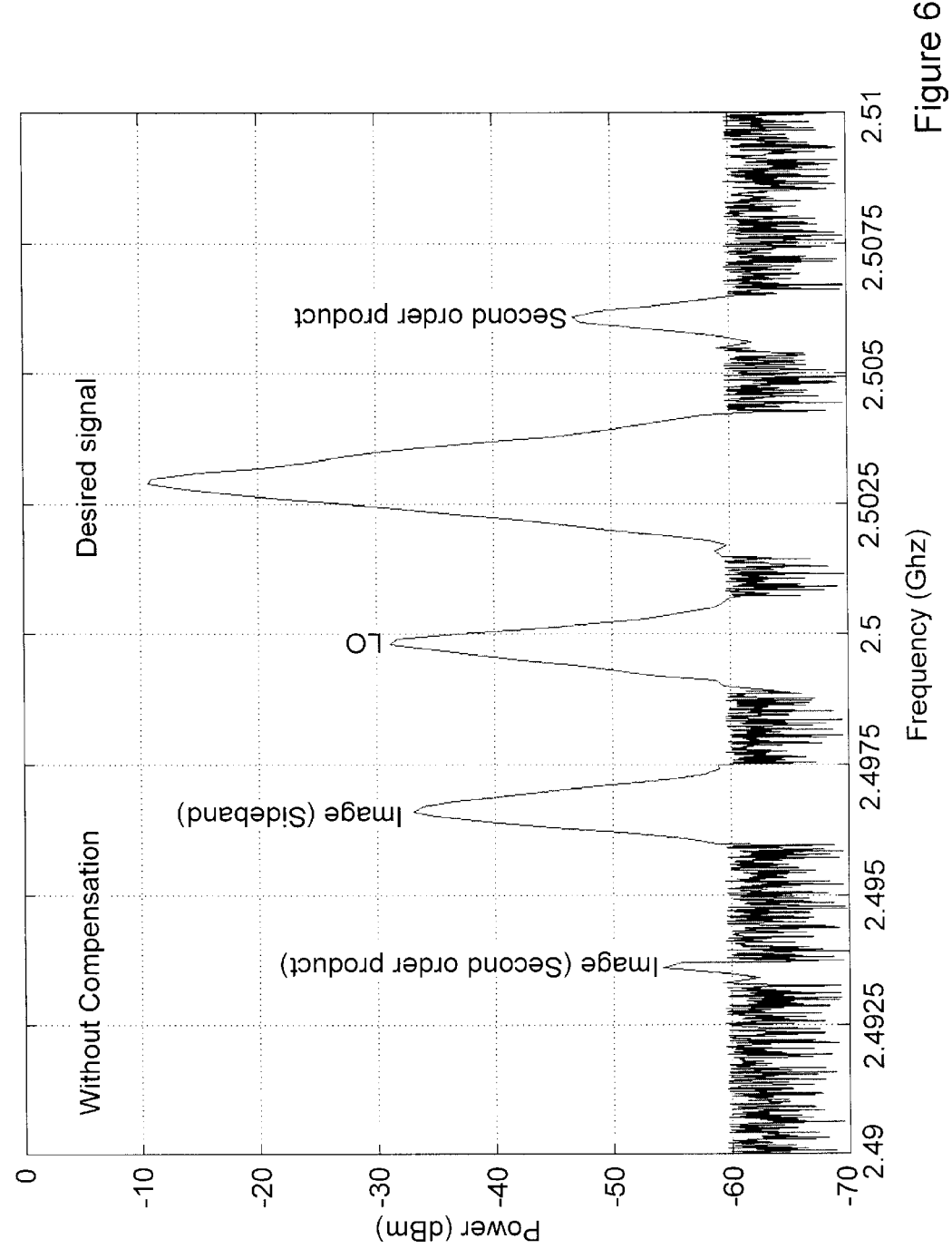
FIG. 6 shows a transmit spectrum of a quadrature-modulated signal without correction of gain/phase imbalances and DC offsets.

Referring now to FIG. 6, shown is a transmit spectrum of a quadrature-modulated signal without correction for gain/phase imbalances and DC offsets. Besides the main signal, there are unwanted signals, causing distortion of the original signal. Referring now to FIG. 7, shown is a transmit spectrum of a quadrature-modulated signal with correction for gain/phase imbalances and DC offsets according to the other embodiment of the instant invention. The sidebands due to DC offset and gain/phase imbalance are effectively suppressed, resulting in a reduction of noise and overall signal distortion, enhancing the signal quality. LO leakage and image suppression are improved by at least 20 dB. FIGS. 6 and 7 illustrate how a method according to the instant invention leads to an improvement of a transmit spectrum.

The methods according to the instant invention avoid a use of approximation on the values of the pre-distortion coefficients and are thus applicable to a wide range of distortions. The proposed methods are truly adaptive to cope with time-induced variation in direct transmitter's performance. The instant invention is applicable to wireless communication systems, and particularly to broadband transmission systems in the $\mu$m- and mm-wave range.

Although the instant invention has been described with respect to specific embodiments thereof, various changes and modifications are optionally carried out by those skilled in the art without departing from the scope of the invention. Therefore, it is intended that the present invention encompasses such changes and modifications as fall within the scope of the appended claims.

What is claimed is:

1. A method for self-calibrating a vector modulator comprising a step of:
   determining pre-distortion coefficients in dependence upon an in-phase signal, a quadrature signal, and an output envelope of an RF signal, the method comprising the steps of
   transforming a value representative of an output envelope represented in a nonlinear domain into a value representative of the output envelope represented in a linear domain;
   determining a parameter vector x as a solution of a linear equation within the linear domain, wherein the linear equation is solved using N values obtained from at least N measurements, the values being components of a vector p, identified by $p_0(i)$, $1 \leq i \leq N$, where N is a positive integer; and
   determining the pre-distortion coefficients from the parameter vector x.

2. A method according to claim 1, wherein the method is absent a step of approximation in the step of transforming.

3. A method according to claim 2, wherein the method is absent a step of approximation in the determination of pre-distortion coefficients.

4. A method according to claim 1, wherein the linear equation is solved using a least square process.

5. A method according to claim 4, wherein the linear equation is solved using an adaptive least-mean-square process.

6. A method according to claim 4, wherein the linear equation is solved using an adaptive recursive least-squares process.

7. A method according to claim 1, further comprising the steps of:
   pre-distorting an in-phase signal I(n) and a quadrature signal Q(n) based on pre-distortion coefficients $C_1$, $C_Q$, $h_1$ and $h_2$;
   providing the pre-distorted in-phase signal $I_c(n)$ and the pre-distorted quadrature-signal $Q_c(n)$ to a vector modulator;
   modulating the pre-distorted in-phase signal $I_c(n)$ and the pre-distorted quadrature signal $Q_c(n)$ to provide modulated signals;
   combining the modulated signals to provide output RF signal;
   providing the pre-distorted in-phase signal $I_c(n)$ and the pre-distorted quadrature-signal $Q_c(n)$ to a digital signal processor; and
   providing the digital envelope of the output RF signal to the digital signal processor.

8. A method according to claim 7, wherein the pre-distortion coefficients are chosen such that the modulated in-phase signal and the modulated quadrature signal obey predefined relationships.

9. A method according to claim 8, wherein the pre-distortion coefficients relate to gain imbalance and to phase imbalance between the modulated in-phase signal and the modulated quadrature signal.

10. A method according to claim 9, wherein the pre-distortion coefficients relate to DC offsets of the modulated in-phase signal and the modulated quadrature signal.

11. A method according to claim 1, wherein the value representative of the output envelope represented in the nonlinear domain, the output envelope being transformed to represent an output power p(t), is expressed as:

$$p(t) = I^2(t) + (2C_I - 2\alpha C_Q \sin(\phi))I(t) - 2\alpha \sin(\phi)I(t)Q(t)$$
$$+ (2\alpha^2 C_Q - 2\alpha C_I \sin(\phi))Q(t) + \alpha^2 Q^2(t)$$
$$+ (C_I^2 + \alpha^2 C_Q^2 - 2\alpha C_I C_Q \sin(\phi)).$$

12. A method according to claim 1, wherein the value representative of the output envelope represented in the linear domain, output envelope being transformed to represent an output power $p_0(n)$, is expressed as:

$$p_0(n) = a^T(n)x + w(n).$$

13. A method according to claim 7, wherein the pre-distorted in-phase signal $I_c(n)$ and the pre-distorted quadrature signal $Q_c(n)$ obey a relationship to the in-phase signal I(n) and the quadrature signal Q(n), the relationship expressed as:

$$\begin{pmatrix} I_c(n) \\ Q_c(n) \end{pmatrix} = \begin{pmatrix} 1 & -\alpha \sin(\phi) \\ 0 & \alpha \cos(\phi) \end{pmatrix}^{-1} \begin{pmatrix} I(n) \\ Q(n) \end{pmatrix} - \begin{pmatrix} C_I \\ C_Q \end{pmatrix}.$$

14. A method according to claim 1, further comprising the steps of:
   generating the in-phase signal and the quadrature signal;
   generating the RF output signal in dependence on the in-phase signal and the quadrature signal; and
   sensing the envelope of the output RF signal for providing the value representative of an output power represented in a nonlinear domain.

15. A method according to claim 14, wherein the in-phase signal and the quadrature signal are generated according to pre-defined relationships for the in-phase signal and the quadrature signal.

16. A method according to claim 15, wherein the output envelope being transformed to represent an output power $p_1$ is expressed as:

$$p_t = \sigma_I^2 x_1 + \mu_I x_2 + \gamma x_3 + \mu_Q x_4 + \sigma_Q^2 x_5 + x_0.$$

17. A method according to claim 16, wherein the pre-distortion coefficients $C_1$, $C_Q$, $h_1$ and $h_2$ are determined from individual terms $$\sigma_x^2, \mu_x, \gamma, x_n;$$

subscript X=I or Q; $0 \leq n \leq 5$, the individual terms defining the output power $p_1$.

18. A compensating quadrature modulator for self-calibrating a vector modulation process, the compensating quadrature modulator comprising:
an I-signal transmit chain for pre-distorting and transmitting an in-phase signal;
a Q-signal transmit chain for pre-distorting and transmitting a quadrature signal;
a vector modulator for modulating the in-phase signal and the quadrature signal and for providing an analog RF output signal;
an envelope detector coupled to the output of the vector modulator for detecting the analog RF output signal and for providing an analog envelope of the RF output signal;
an analog-to-digital converter coupled to the envelope detector for receiving the analog envelope of the RF output signal and for converting the received signal into a digital envelope of an RF output signal; and
a digital signal processor for determining at least a digital signal pre-distortion coefficient by which signals in one of the I-signal transmit chain and the Q-signal transmit chain are pre-distorted, the digital signal processor being coupled to the analog-to-digital converter, and being coupled to the I-signal transmit chain and the Q-signal transmit chain;
wherein the digital signal processor comprises circuitry for performing the steps of:
transforming a value representative of an output envelope represented in a nonlinear domain into a value representative of the output envelope represented in a linear domain;
determining a parameter vector x as a solution of a linear equation within the linear domain, wherein the linear equation is solved using N values obtained from at least N measurements, the values being components of a vector p, identified by $p_0(i)$, $1 \leq i \leq N$, where N is a positive integer; and
determining the pre-distortion coefficients from the parameter vector x.

19. A compensating quadrature modulator according to claim 18, wherein the digital signal processor comprises receiver ports for receiving signals from the vector modulator and the I-signal transmit chain and the Q-signal transmit chain, the steps of transforming and determining being performed in dependence on signals received at the receiver ports.

20. A compensating quadrature modulator according to claim 18, wherein the Q-signal transmit chain comprises:
a digital portion including at least an adder for adding to a digital signal and at least a multiplier for multiplying a digital signal;
an analog portion coupled to the vector modulator; and
a digital-to-analog converter for coupling the digital portion and the analog portion.

21. A compensating quadrature modulator according to claim 20,
wherein the I-signal transmit chain comprises:
a digital portion including at least an adder for adding to a digital signal;
an analog portion coupled to the vector modulator; and
a digital-to-analog converter for coupling the digital portion and the analog portion.

22. A compensating quadrature modulator according to claim 20,
wherein the multiplier includes a port for receiving a pre-distortion coefficient, and
wherein a signal propagating through the Q-signal transmit chain is pre-distorted by multiplication with the pre-distortion coefficient estimated by the digital signal processor, the multiplication performed by the at least a multiplier.

23. A compensating quadrature modulator according to claim 20,
wherein the adder includes a port for receiving a pre-distortion coefficient estimated by the digital signal processor; and
wherein a signal passing through the Q-signal transmit chain is pre-distorted by addition of the pre-distortion coefficient, the addition performed by the at least an adder.

24. A compensating quadrature modulator according to claim 21,
wherein the adder includes a port for receiving a pre-distortion coefficient estimated by the digital signal processor, and
wherein a signal passing through the I-signal transmit chain is pre-distorted by addition of the pre-distortion coefficient, the addition performed by the at least an adder.

25. A compensating quadrature modulator according to claim 21,
wherein the adder includes a port for receiving another signal; and
wherein a signal passing through the I-signal transmit chain is pre-distorted by addition of the other signal, the addition performed by the at least an adder.

* * * * *